United States Patent
Otani

(10) Patent No.: US 10,965,836 B2
(45) Date of Patent: Mar. 30, 2021

(54) IMAGE PROCESSING APPARATUS, CONTROL METHOD THEREOF, AND NON-TRANSITORY COMPUTER-READABLE STORAGE MEDIUM THAT EXECUTE A DENSITY UNEVENNESS CORRECTION PROCESS IN ACCORDANCE WITH PROPERTIES OF RECORDING ELEMENTS

(71) Applicant: CANON KABUSHIKI KAISHA, Tokyo (JP)

(72) Inventor: Ryosuke Otani, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/507,766

(22) Filed: Jul. 10, 2019

(65) Prior Publication Data

US 2020/0028988 A1 Jan. 23, 2020

(30) Foreign Application Priority Data

Jul. 17, 2018 (JP) .............................. JP2018-134478
May 7, 2019 (JP) .............................. JP2019-087725

(51) Int. Cl.
  *H04N 1/405* (2006.01)
  *G06K 15/02* (2006.01)
  *H04N 1/407* (2006.01)

(52) U.S. Cl.
  CPC ....... *H04N 1/4051* (2013.01); *G06K 15/1877* (2013.01); *H04N 1/407* (2013.01)

(58) Field of Classification Search
  None
  See application file for complete search history.

(56) References Cited

U.S. PATENT DOCUMENTS 8,902,470 B2 * 12/2014 Misaizu ................... H04N 1/40
  358/3.1
9,330,347 B2 * 5/2016 Kikuta ............... G06K 15/1881
(Continued)

FOREIGN PATENT DOCUMENTS

JP   2005-161817 A   6/2005
JP   2013-163307 A   8/2013
JP   2016-021735 A   2/2016

OTHER PUBLICATIONS

Extended European Search Report dated Dec. 16, 2019, issued in corresponding European Patent Application No. 19185674.9.

*Primary Examiner* — Dung D Tran
(74) *Attorney, Agent, or Firm* — Venable LLP

(57) ABSTRACT

An image processing apparatus generates image data for an image forming apparatus having a recording head with recording elements in a first direction that forms an image on a recording medium by ejecting ink from the elements toward the medium fed in a second direction perpendicular to the first. The apparatus has an acquiring unit that acquires multi-valued input image data having a uniform tone, a conversion unit that converts the input image data into halftone image data indicating a dot pattern, by using a dither matrix, and a correction processing unit that executes a density unevenness correction process in accordance with properties of each of the elements. The properties of the elements are obtained by reading a chart image formed based on the halftone image data. The dither matrix is a dispersive dither matrix with a size of Sx rows corresponding to the second direction, Sx, a natural number.

8 Claims, 9 Drawing Sheets

(56) References Cited

U.S. PATENT DOCUMENTS

| | | |
|---|---|---|
| 9,569,706 B2 | 2/2017 | Kodama et al. |
| 2004/0218221 A1 | 11/2004 | Hirano et al. |
| 2004/0218222 A1 | 11/2004 | Damera-Venkata |
| 2007/0041054 A1* | 2/2007 | Kakutani ............. H04N 1/4105 358/3.16 |
| 2007/0097439 A1* | 5/2007 | Yamada ............... H04N 1/4078 358/3.1 |
| 2011/0084996 A1* | 4/2011 | Hirato .................... B41J 2/0451 347/10 |
| 2014/0139852 A1* | 5/2014 | Yamada ................ G06K 15/02 358/1.9 |
| 2015/0070419 A1* | 3/2015 | Sudo ..................... B41J 2/0456 347/9 |
| 2017/0085750 A1 | 3/2017 | Kaysuyama |
| 2017/0102632 A1* | 4/2017 | Yamada ............. G03G 15/0121 |
| 2017/0116502 A1 | 4/2017 | Kodama et al. |
| 2017/0150009 A1* | 5/2017 | Tamura ............... H04N 1/3877 |
| 2017/0223224 A1* | 8/2017 | Nagai .................. H04N 1/3877 |
| 2018/0103178 A1* | 4/2018 | Tamura ............... H04N 1/4053 |
| 2019/0197373 A1 | 6/2019 | Kodama et al. |

* cited by examiner

IMAGE PROCESSING APPARATUS, CONTROL METHOD THEREOF, AND NON-TRANSITORY COMPUTER-READABLE STORAGE MEDIUM THAT EXECUTE A DENSITY UNEVENNESS CORRECTION PROCESS IN ACCORDANCE WITH PROPERTIES OF RECORDING ELEMENTS

BACKGROUND OF THE INVENTION

This application claims the benefit of Japanese Patent Applications No. 2018-134478, filed Jul. 17, 2018, and No. 2019-087725, filed May 7, 2019, which are hereby incorporated by reference herein in their entireties.

FIELD OF THE INVENTION

The present invention relates to a technique for converting a multi-tone image into an image having a lower number of tones than the number of tones in the stated image.

DESCRIPTION OF THE RELATED ART

Ink-jet recording apparatuses serving as output apparatuses for computers have been known for some time. An ink-jet recording apparatus includes a recording head in which a plurality of ink ejection openings (nozzles) are arranged, and a desired image is formed on a recording medium by causing the recording head to move relative to the recording medium while ejecting ink droplets (dots) from the nozzles.

Ink-jet printers for commercial printing in particular require a certain level of printing productivity, and, thus, a type that renders images in a single pass (called a "full-line" or "full-multi" type) is often employed. The single-pass rendering method uses a long line head including a nozzle array that covers the entire range of a rendering region in a recording medium width direction (called the "recording medium width direction" or the "y direction" hereinafter), which is perpendicular to the feed direction of the recording medium (called the "feed direction" or the "x direction" hereafter), with the line head configured to extend in the vertical direction relative to the feed direction of the recording medium. The single-pass rendering method only requires the recording medium to move once relative to the line head, and, thus, provides a faster printing speed than the multi-pass method, which requires multiple scans to complete the image.

When printing using such a printer, image processing known as "halftone processing" is carried out to express the tone values of the original image data to be printed as dots that are turned on or off. The printer then executes a printing process according to the image data that has undergone the halftone processing.

A variety of methods have been proposed for halftone processing, with a representative example being dithering. Dithering employs a dither matrix of a predetermined size, in which mutually-different thresholds are arranged. Specifically, the dither matrix is repeatedly laid out in the form of tiles on the image data, and the magnitudes of the tone values (pixel values) of the input image are compared to corresponding thresholds. The tones are expressed as dots that are "on" if the tone value is greater than the threshold and dots that are "off" if the tone value is less than or equal to the threshold.

With this dithering method, unbalance arises in the number of dot ejections (ejection frequency) from nozzle to nozzle in the dot pattern generated by the dither matrix. This causes a problem in that the nozzles that eject ink more frequently will have a shorter lifespan, and the head itself will have a shorter lifespan as a result.

Japanese Patent Laid-Open No. 2005-161817 proposes, as an image recording apparatus that solves this problem, a method in which, rather than repeatedly laying out the dither matrix in the form of tiles as in the past, the dither matrix is laid out having been shifted in the recording medium width direction. This makes it possible to suppress unbalance in the number of dot ejections from nozzle to nozzle. However, if what is known as a dot-dispersion dither matrix is used, which increases image quality by shifting the spatial frequency distribution to greater than or equal to a constant frequency difficult to perceive by humans, there are cases when the method disclosed in the stated document cannot sufficiently suppress unbalance in the number of dot ejections from nozzle to nozzle.

A blue noise dither matrix having blue noise characteristics, a green noise dither matrix having green noise characteristics, and the like, can be given as examples of dot-dispersion dither matrices. A blue noise dither matrix is a dither matrix that, in consideration of human visual characteristics, has the locations of the thresholds adjusted so that the dots are dispersed. This causes the spatial frequency of the dot arrangement to shift toward a higher frequency, which suppresses a sense of graininess. A green noise dither matrix, meanwhile, is a dither matrix that has the locations of the thresholds adjusted so that groups of several dots are formed adjacent to each other, but collections of dots are dispersed on the whole. A printer that has difficulty in stably forming a dot at a fineness of around a single pixel can suppress the occurrence of solitary dots by referring to this type of green noise matrix to determine whether or not to form a dot.

A relatively large dither matrix is used for such a dot-dispersion dither matrix. For example, if a dither matrix having 256 pixels in the feed direction of the recording medium and 256 pixels in a direction orthogonal to the feed direction of the recording medium is used, a width of 65,536 pixels in the feed direction (obtained by taking a matrix having a width of 256 pixels in the feed direction and laying out that matrix with 256 shifts in the recording medium direction) is required to make the nozzle usage efficiency perfectly uniform. However, when an image object in the original image data to be rendered is, for example, 20 mm (1,200 dpi) in the feed direction, the size of the image object is approximately 945 pixels. Dots will, therefore, be generated with some of the thresholds in the applied dither matrix, and, thus, unbalance in the nozzle usage rate cannot be suppressed. In other words, there is a problem in that if the image object in the original image data is relatively small compared to a dither matrix laid out having been shifted in the recording medium width direction, the number of dot ejections from nozzle to nozzle cannot be made sufficiently uniform.

SUMMARY OF THE INVENTION

Having been achieved in light of the above-described problem, the present invention provides a technique for suppressing unbalance in the number of dot ejections for each of recording elements, such as nozzles, in halftone processing using a dither matrix.

The invention in its aspect provides an image processing apparatus that generates image data for an image forming apparatus, the image forming apparatus having a recording head in which a plurality of recording elements are arranged in a first direction, and that forms an image on a recording medium by ejecting ink from the recording elements of the recording head toward the recording medium while the recording medium is fed relatively in a second direction that is perpendicular to the first direction, the image processing apparatus comprising an acquiring unit configured to acquire multi-valued input image data, a correction processing unit configured to execute a density unevenness correction process in accordance with properties of each of the recording elements, and a conversion unit configured to convert the input image data, on which the density unevenness correction processing has been executed by the correction processing unit, into halftone image data indicating the presence/absence of a dot, by using a dither matrix, wherein the dither matrix is a dispersive dither matrix, and has characteristics in which, when input image data having a uniform tone is converted into binary halftone image data, the same number of dots are present at each of locations in the first direction, in a predetermined range in the second direction, for a tone, among the tones that the input image data can take on, that is subject to the density unevenness correction process.

The present invention makes it possible to suppress imbalance in the number of dot ejections for each of recording elements such as nozzles.

Further features of the present invention will become apparent from the following description of exemplary embodiments (with reference to the attached drawings).

DESCRIPTION OF THE EMBODIMENTS

Figure 1:
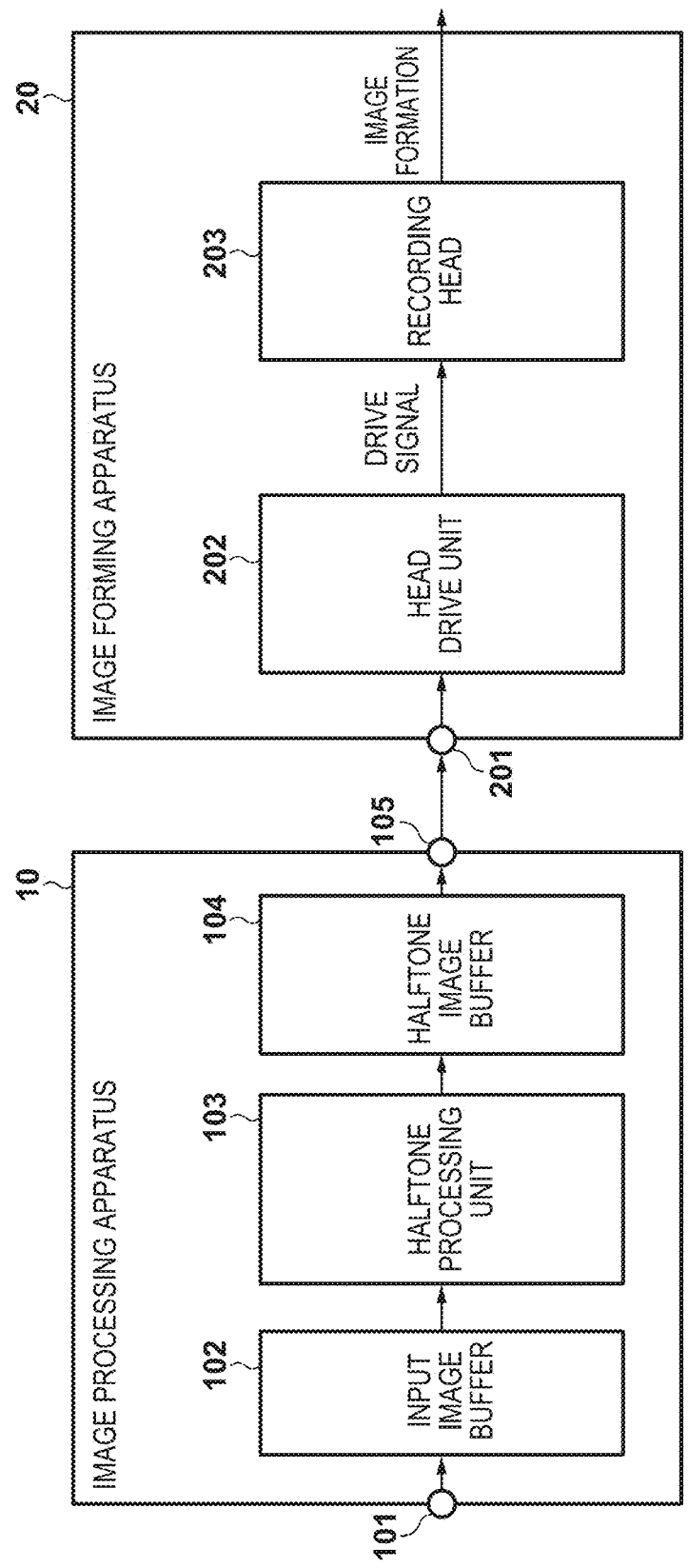
FIG. 1 is a block diagram illustrating the configuration of an image processing apparatus and an image forming apparatus according to a first embodiment.

Hereafter, embodiments of the present invention will be described in detail with reference to the appended drawings. It should be noted that the configurations described in the following embodiments are merely examples, and that the present invention is not intended to be limited to the configurations illustrated in the drawings.

First Embodiment

FIG. 1 is a block diagram illustrating the configuration of an image processing apparatus and an image forming apparatus that can be applied in the first embodiment. In FIG. 1, an image processing apparatus 10 and an image forming apparatus 20 are connected by an interface or a circuit. The image processing apparatus 10 is, for example, a typical personal computer in which a printer driver is installed. In this case, the units of the image processing apparatus 10 described below are realized by the computer executing predetermined programs. However, the configuration may be such that the image forming apparatus 20 includes the image processing apparatus 10.

The image processing apparatus 10 stores image data to be output, which has been input from an image data input unit 101, in an input image buffer 102. Although the format of the image data input to the image data input unit 101 is not particularly limited, the image data is assumed to be a tone image having the same type of colors as the inks used by the image forming apparatus 20, the same number of colors, and the same resolution, for the sake of simplicity. For example, if the image forming apparatus 20 is an ink jet printing system that realizes an output resolution of 1,200 dpi using four colors of ink, namely, cyan (C), magenta (M), yellow (Y), and black (K), the image data is multi-valued image data having eight bits (256 tones) for each of the CMYK colors. Note that a variety of formats are possible for the image data of the image to be printed. When printing image data having a different combination of colors, resolution, or the like, from the type of ink colors, resolution, and the like, used by the image forming apparatus 20, a preprocessing unit (not shown) may carry out processing such as color conversion and resolution conversion in a stage prior to the image data input unit 101, and the data may be input to the image data input unit 101 after being converted into image data having the same ink colors and resolution as those used by the image forming apparatus 20.

A halftone processing unit 103 uses a dither matrix to convert the image data stored in the input image buffer 102 into a number of tones that can be directly expressed by the image forming apparatus 20 (a halftone process) and set a dot arrangement to be formed by a nozzle group. This creates halftone image data. In the dither matrix, a threshold group is arranged in accordance with the number of tones that can be simultaneously expressed. The number of tones that can be simultaneously expressed is determined by the number of values used as the thresholds present in simultaneously dither matrix. A method of generating the dither matrix will be described in detail later. The halftone processing unit 103 outputs the created halftone image data to a halftone image buffer 104. The buffered halftone image data is output to the image forming apparatus 20 from an output terminal 105.

Figure 3:
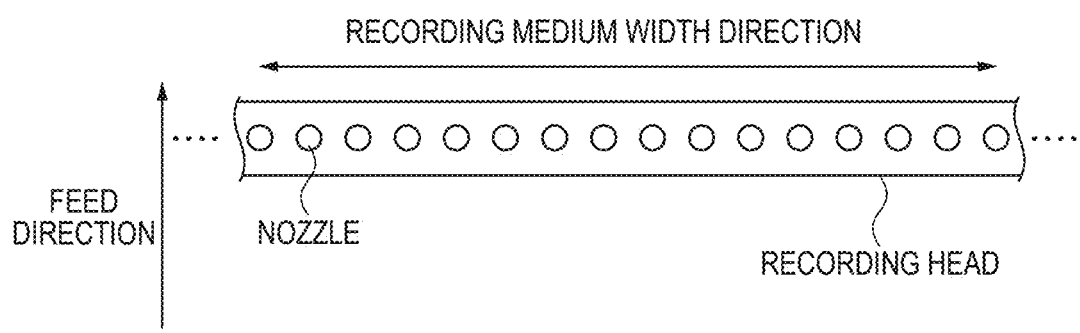
FIG. 3 is a diagram illustrating a recording head according to a first embodiment.

On the basis of the halftone image data, which is received from the image processing apparatus 10 through an input terminal 201, the image forming apparatus 20 forms an image on a recording medium, such as recording paper, by forming dots on the recording medium while moving the recording medium relative to a recording head 203. Here, the recording head 203 uses an ink jet recording method, and includes a recording-element array in which a plurality of recording elements capable of ejecting ink are arranged. FIG. 3 is a diagram illustrating an example of the configuration of the recording head 203. Although the recording head typically includes nozzles for four types of ink, namely, cyan (C), magenta (M), yellow (Y), and black (K), only black (K) is illustrated for the sake of simplicity. The recording head is a long line head in which the nozzle arrangement covers the entire range of the rendering region in the recording medium width direction (the x direction), which is perpendicular to the recording medium feed direction (the y direction), and a printed image is formed by ejecting ink while moving the recording medium relative to the head once. A head drive unit 202 generates a drive signal for controlling the recording head 203 on the basis of the halftone image data. The recording head 203 records the actual ink dots on the recording medium, on the basis of the drive signal. It is assumed that the recording elements in the cyan (C), magenta (M), and yellow (Y) recording heads are arranged parallel to the black head that is illustrated.

The halftone processing unit 103 according to the present embodiment will be described in detail next.

Figure 2:
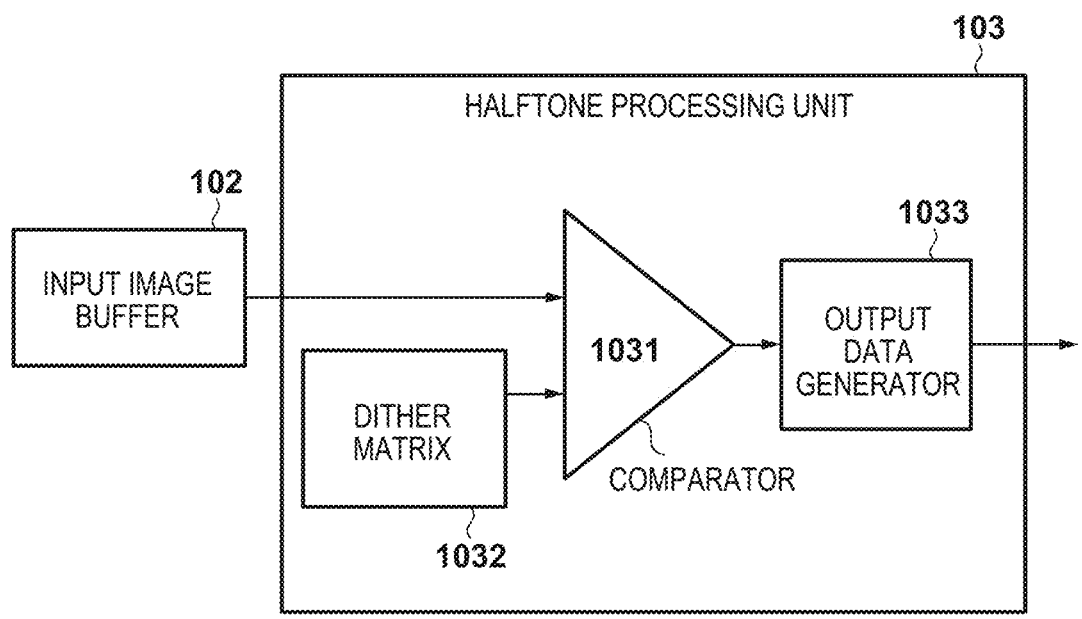
FIG. 2 is a block diagram illustrating a halftone processing unit according to the first embodiment.

FIG. 2 is a block diagram illustrating the configuration of the halftone processing unit 103 in detail. The halftone processing unit 103 converts the image data stored in the input image buffer 102 into binary (1-bit) data for each nozzle group, and outputs the converted data. To achieve this processing, the halftone processing unit 103 includes a comparator 1031, a dither matrix 1032 (constituted by a ROM, or the like), and an output data generator 1033.

Here, the input image data stored in the input image buffer 102 is defined as Iin, the number of pixels thereof in the x direction (the recording medium feed direction, here) is defined as W, and the number of pixels thereof in the y direction (the direction orthogonal to the recording medium feed direction (called simply the "width direction" hereafter) is defined as H. The pixel value at coordinates (x,y) of the input image Iin (where 0≤x≤W−1 and 0≤y≤H−1) is expressed as Iin(x,y). The dither matrix 1032 is assumed to have Sx rows (the size in the x direction) and Sy columns (the size in the y direction), and the threshold at coordinates (i,j) in the dither matrix is expressed as M(i,j). The output image data generated by the output data generator 1033 (binary image data) is defined as Tout, and the output value of the coordinates (x,y) thereof is represented by Iout(x,y). Here, a remainder obtained when dividing an integer "a" by an integer "b" is expressed as "a % b".

The comparator 1031 compares the magnitude of the pixel value Iin(x,y) at the coordinates (x,y) of the input image data Iin from the input image buffer 102 and the threshold M(x % Sx,y % Sy) of the dither matrix, and outputs the result of the comparison (a comparison result) to the output data generator 1033. If Iin(x,y) is greater than the threshold M(x % Sx,y % Sy), the output data generator 1033 generates "BLACK", indicating that a black dot is to be formed, as the output value Iout(x,y). However, if Iin(x,y) is less than or equal to the threshold M(x % Sx,y % Sy), the output data generator 1033 generates "WHITE", indicating that a dot is not to be formed, as the output value Iout(x,y). The following descriptions will also refer to forming or not forming a dot as turning a dot "on" or "off".

Essentially, the processing carried out by the halftone processing unit 103 can be expressed as follows.

$$Iout(x,y)=BLACK \text{ if } Iin(x,y)>M(x \% Sx, y \% Sy)$$

$$Iout(x,y)=WHITE \text{ if } Iin(x,y) \leq M(x \% Sx, y \% Sy)$$

In reality, the output data generator 1033 generates a binary image in which the output value "BLACK" is, for example, a 1-bit "1" and "WHITE" is "0".

Figure 4:
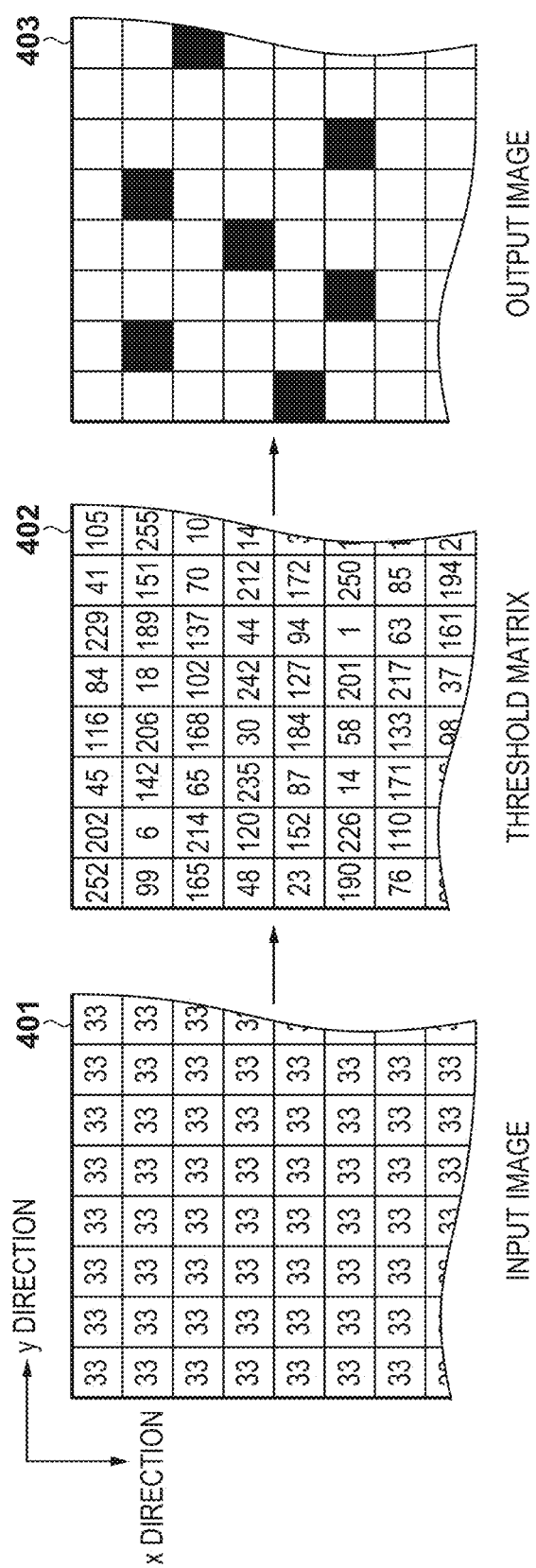
FIG. 4 is a diagram illustrating the halftone processing unit according to the first embodiment.

An example of the above-described halftone processing will be described here with reference to FIG. 4. In FIG. 4, reference sign 401 indicates part of the input image data, reference sign 402 indicates part of a dither matrix M, and reference sign 403 indicates part of the output data. In the input image data 401, a single pixel is expressed by eight bits, for example, and, thus, each pixel can have a value in a range from 0 to 255.

The dither matrix 402 has a total of 65,536 thresholds, i.e., 256 in the x direction and 256 in they direction, and each threshold is selected from the value range of from 0 to 255 without any duplicate thresholds.

Here, BLACK (forming a black dot) is set as the output value when the pixel value of the input image data exceeds the corresponding threshold, and WHITE (not forming a dot) is set as the output value when the pixel value is less than or equal to the corresponding threshold. Thus, when the dither matrix 402 illustrated here is used, a dot arrangement having 256 tones is obtained. In other words, if the halftone processing is carried out using the dither matrix 402, tones in 256 levels from 0 to 255, in a range of 256 pixels×256 pixels, can be simultaneously expressed as the output data. In the drawing, the input image 401 is an image having only pixel values of "33", and the output data 403 illustrated in the drawing is obtained when the dither matrix 402 is used.

As can also be understood from the above, it can be said that there is a high likelihood of dots turned on at pixel locations where the threshold of the dither matrix is low, and a high likelihood of dots turned off at pixel locations where the threshold is high. As such, if relatively low thresholds of the dither matrix are concentrated at a specific nozzle row, those nozzles will eject ink more frequently, which shortens the lifespan of the nozzles.

To enable a recording head to be used as long as possible, it is preferable to suppress the occurrence of nozzles that eject ink extremely frequently by eliminating imbalance in the number of ink dots ejected by the nozzles and make that number uniform. To achieve this, it can be said that adjusting the threshold arrangement in the dither matrix so that the dots formed by the nozzles are produced at a uniform frequency with respect to the same input tone values.

As such, the following will describe a method of creating a dot-dispersion dither matrix in which the frequency at which the dots formed by the respective nozzles are generated is adjusted to be uniform. In the following descriptions, the dither matrix will be represented by "M" during or after the generation process. The dither matrix M is a two-dimensional matrix that takes the number of thresholds (size) arranged in the x direction (the recording medium feed direction) as Sx and the number of thresholds arranged in the Y direction (the width direction of the recording medium) as Sy, and Sx,Sy is a natural number. Although the size (Sx,Sy) of the dither matrix may be any size, the matrix is typically a square where each side has a length that is a power of two, with each side preferably being greater than or equal to 256 (e.g., 256×256 or 512×512). In the present embodiment, both Sx and Sy are 256. Thresholds from 0 to 65,535 are stored in the dither matrix M created in the present embodiment. Thus when halftone processing is carried out using the dither matrix M, 256 tones can be simultaneously recreated in the region corresponding to Sx×Sy.

The "void & cluster method" is known as a method that can generate a dot-dispersion dither matrix. The void & cluster method finds a smoothed density image by applying a low-pass filter, and determines an arrangement in which dots should be added/removed in order to suppress local variations in the density. In the present embodiment as well, a similar method is used to generate a dot-dispersion type dither matrix having blue noise characteristics.

The dot pattern generated through this process is represented by d(x,y). By this, d(x,y) is a two-dimensional arrangement, and the size is the same as M(x,y). The value of each pixel at d(x,y) is expressed in binary, with "1" indicating that a dot is present and "0" indicating that a dot is not present.

The dot pattern d(x,y) changes through an iterative process. Through this iterative process, Sx×Sy+1 dot patterns, from a dot pattern in which the number of dots is 0 to a dot pattern in which the number of dots is Sx×Sy, are generated. Accordingly, when the number of dots in the dot pattern d(x,y) is represented by g, a given single point in time in the iterative process can be isolated using g. In the following descriptions, the number of dots g will be called a "tone value g". Furthermore, in the following descriptions, the dot pattern d(x,y) when the tone value is g will be expressed as d(g,x,y), or simply d(g) with x,y omitted. As described above, in the present embodiment, a dither matrix capable of simultaneously recreating 256 tones is created, and, thus, all natural number values, from 0 to Sx×Sy−1, are set for the tone g in the following processing.

Figure 5:
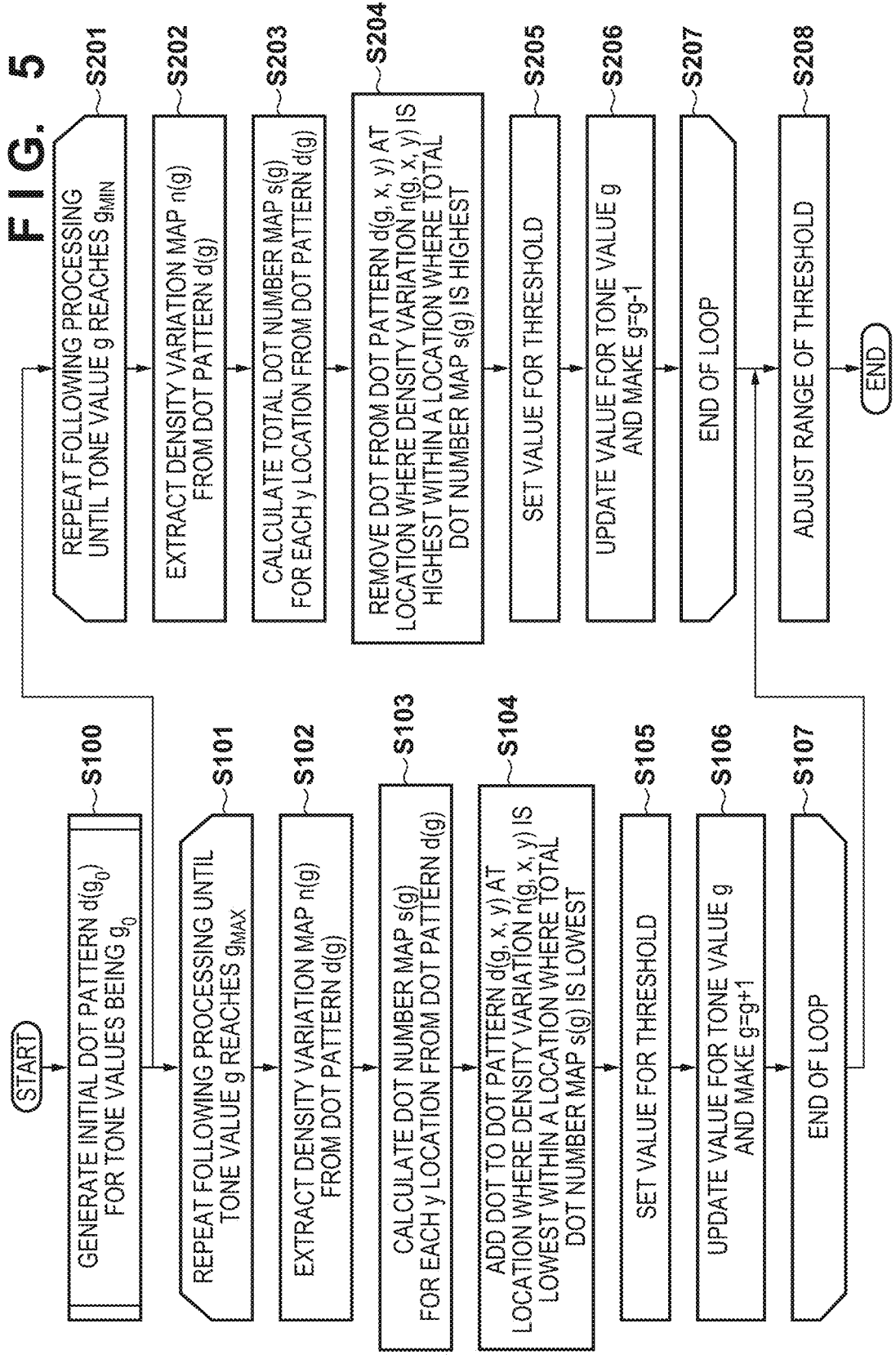
FIG. 5 is a flowchart illustrating a sequence for creating a dither matrix applied in the first embodiment.

The present embodiment will be described in detail next with reference to FIG. 5. FIG. 5 is a flowchart illustrating the overall flow of a method of generating a dither matrix, and illustrates a dither matrix generation process in which a CPU (not shown) of the image processing apparatus 10 illustrated in FIG. 1 uses the halftone processing unit 103. Note that, to ensure the dither matrix can be reused in the next printing process, the dither matrix may be stored in non-volatile memory (not shown) to eliminate the need to execute the processing more than once. Furthermore, if the image processing apparatus 10 is an information processing apparatus, such as a personal computer, a program corresponding to the illustrated flowchart is realized as a part of an application or a printer driver.

In step S100, the CPU generates an initial dot pattern d(g0) in which the tone values are a predetermined tone g0. In the present embodiment, the number of tones g0 in the initial dot pattern is Sx×Sy×0.5=256×256×0.5=32,768. The method of generating the initial dot pattern will be described later. Note that the initial dot pattern d(g0) can also be an image in which the number of tones g0, in which not even one dot is present, is zero. Step S100 is not carried out in that case.

Steps S101 to S107 are a process for iteratively adding dots, with the initial dot pattern serving as a starting point. Steps S201 to S207, meanwhile, are a process for iteratively removing dots, with the initial dot pattern serving as a starting point. Note that dots are not removed when iteratively adding dots. Conversely, dots are not added when iteratively removing dots.

Steps S101 and S107 indicate the ends of a loop, and the processing from steps S102 to S106 between the loop ends are repeated until the tone value g reaches gMAX. The processing from steps S102 to S106 is processing that generates continuous tone values, i.e., a dot pattern in which the tone values are g+1, by adding a single dot to the dot pattern in which the tone values are g. gMAX, which sets the condition for ending the processing, is greater than or equal to g0, and in the present embodiment, gMAX=Sx×Sy−1=65, 535.

Likewise, steps S201 and S207 indicate the ends of a loop, and the processing from steps S202 to S206 between the loop ends are repeated until the tone value g reaches gMIN. The processing from steps S202 to S206 is processing that generates continuous tone values, i.e., a dot pattern in which the tone values are g−1, by removing a single dot from the dot pattern in which the tone values are g. gMIN≤g0, and in the present embodiment, gMIN=0. Dot patterns having all the tones are generated by iteratively adding dots and iteratively removing dots in this manner.

The processing of steps S102 and S202 are the same, and, thus, only step S102 will be described below. In step S102, the CPU applies a low-pass filter to the dot pattern d(g) corresponding to the tone value g to calculate a density variation map n(g). The density variation map n(g) will be shortened to "density variation n(g)" in the following descriptions.

The density variation n(g) is used to evaluate the sparseness of the dots in the dot pattern d(g) in which the tone value is g. The lower the value of the density variation n(g) is, the lower the smoothed density is, and the dots are evaluated as being more sparse, whereas the higher the value of the density variation n(g) is, the higher the smoothed density is, and the dots are evaluated as being more concentrated. In step S104, described later, dots are added in locations where the value of the density variation n(g) is low and the dots are sparse. Additionally, in step S204, dots are removed from locations where the value of the density variation n(g) is high and the dots are concentrated. This suppresses localized variations in density and achieves a low level of graininess.

The density variation n(g) is a two-dimensional arrangement having the same size as the dot pattern d(g), and like the dot pattern d(g), the values in the arrangement change depending on the tone value g. In the following descriptions, n(g) is also denoted as n(g,x,y). It is assumed that the dither matrix is applied cyclically to the input image. As such, in the filtering process of step S103, the CPU generates the density variation n(g) using a recursive convolution operation on the dot pattern d(g) and a filter coefficient. The recursive convolution operation is an operation in which a normal convolution operation is carried out between the dot pattern d(g), for which a cyclic boundary condition has been set, and a filter coefficient. Note that the filter coefficient used in step S103 will be described in detail later.

The processing of steps S103 and S203 are the same, and, thus, only step S103 will be described below. In step S103, the CPU calculates a total dot number map s(g) in the x direction, for each location in the y direction, from the dot pattern d(g) corresponding to the tone value g. The total dot number map s(g) is a one-dimensional arrangement, and s(g) is also denoted as s(g,y). Arrangement restrictions are used to make the number of dots uniform for each location in they direction (for each nozzle). In step S104, which will be described later, dots are added to the dot pattern d(g,x,y) in y locations where the value of s(g,y) is low and the total number of dots is low. Likewise, in step S204, dots are removed from the dot pattern d(g,x,y) in y locations where the value of s(y) is high and the total number of dots is high. This makes it possible to carry out adjustment that reduces differences in the frequencies at which dots are generated by the nozzles.

In steps S104 and S204, the CPU adds or removes dots on the basis of the density variation n(g) and the total dot number map s(g,y). In step S104, the CPU adds a dot to a dot pattern d(g,xMIN,yMIN) at a location (xMIN,yMIN), which is a location, in a y location group where the total dot number map s(g,y) is the lowest, where the density variation n(g,x,y) is the lowest. However, in step S204, the CPU removes a dot from a dot pattern d(g,xMAX,yMAX) at a location (xMAX,yMAX), which is a location, in a y location group where the total dot number map s(g,y) is the highest, where the density variation n(g,x,y) is the highest. Details regarding this process will be given later.

In steps S105 and S205, the CPU determines the value of the dither matrix M(x,y) on the basis of the locations where the dots were added or removed (xMIN,yMIN or xMAX, yMAX). In step S105, the CPU sets the value of M(xMIN, yMIN) in the dither matrix M(x,y) to the tone value g. In step S205, the CPU sets the value of M(xMAX,yMAX) in the dither matrix M(x,y) to the tone value g−1.

In step S106, the CPU increments the value of tone value g to g+1. In step S206, the CPU increments the value of tone value g to g−1.

As described above, once out of the loop from steps S101 to S107 and the loop from steps S201 to S207, the CPU adjusts the range of the pixel values of the input image in accordance with the range of the dither matrix values, in step S208. Before step S208 is carried out, values from gMIN to gMAX are stored in the dither matrix M(x,y). In the present embodiment, values from 0 to 65,535 (mMIN to mMAX) are stored. If the input image is 8-bit when the dithering process is carried out, the range of the input image is from 0 to 255 (thMIN to thMAX). Thus, even if a dither matrix in which values from 0 to 65,535 is used, a suitable halftone processing result cannot be obtained. In step S208, the CPU expands the bit number for the pixel values of the input image so as to match the range of the values in the dither matrix M(x,y). For example, if the range of the values of the dither matrix is sixteen bits, from 0 to 65,535, and the input image is 8-bit, the input image is padded with 0s in the least significant bits to achieve a 16-bit comparison.

On the other hand, the values of the dither matrix may be adjusted to match the range of the pixel values in the input image. For example, the least significant eight bits of the 16-bit dither matrix, which stores values from 0 to 65,535, may be discarded, and the most significant eight bits may be taken as the values of the dither matrix. If the values are to be set to thMIN to thMAX, the CPU obtains the integer part in the following equation as the value of the adjusted dither matrix.

$$a \times M(x,y) + b$$

Here,
a=(thMAX−thMIN)÷(mMAX−mMIN),
b=thMIN−a×mMIN

According to the processing flow described above with reference to FIG. 5, a dither matrix capable of making the ink ejection frequency uniform throughout the nozzles can be generated while maintaining a low level of graininess. Each process in FIG. 5 will be described in detail hereafter.

A filter coefficient f used in steps S102 and S202 will be described first. This filter coefficient is used to extract the density variation map n(g). Here, f is a two-dimensional arrangement, and is also denoted as f(x,y). In the present embodiment, the size of the arrangement f(x,y) is the same as that of the dot pattern d(g). In other words, when the filter size in the x direction is taken as Sfx and the filter size in the y direction is taken as Sfy, the values thereof are 256. The value in the following equation (1) is used as the value of f(x,y).

$$r=\{(x-x_0)^2 \pm (y-y_0)^2\}^{1/2} f(x,y)=1/(r+1) \quad (1)$$

In equation (1), x0,y0 is the central location of the filter coefficient, where x0=Sfx÷2 and y0=Sfy÷2.

In steps S104 and S204, the CPU reduces the sparseness of the dots, and achieves a low level of graininess as a result, by adding or removing dots so as to soften the density variation n(g). To achieve this in a favorable manner, it is necessary to extract the sparseness between dots. The filter f may be set to a function of the inverse of a distance r from the dot, as indicated by equation (1), in order to extract the sparseness between dots. Note that, in the present embodiment, "1" is added to the denominator to avoid dividing by zero when the distance r=0.

The filter f used in steps S104 and S204 is not limited to this filter. A low-pass filter capable of extracting a frequency component visible as a sense of graininess may be used instead.

The dot arrangement method used in steps S104 and S204 will be described next. The CPU adds or removes dots on the basis of the density variation n(g) and the total dot number map s(g,y). Step S104 is a process for adding a dot. In step S104, the CPU adds a dot to the location (xMIN,yMIN), which is a location where a dot is not present, and is a location, among the y locations that are the lowest in the total dot number map s(g,y), where the value of the density variation n(g,x,y) is the lowest. Specifically, the location (xMIN,yMIN), where the value of the density variation n(g,x,y) is lowest, is searched out from among the pixels in a y location group in the total dot number map s(g,y) where the number of dots is the lowest, and among the pixels in the dot pattern d(g,x,y) where the pixel values are zero. The pixel value of d(g,xMIN,yMIN) is set to "1" so that a dot is added. Note that, if there are multiple locations where the value of the density variation map n(g,x,y) is zero, the CPU selects a location where a dot is to be added at random from the multiple locations.

Step S204, on the other hand, is a process for removing a dot. In step S204, the CPU removes a dot from a location (xMAX,yMAX), which is a location where a dot is present, and is a location, among the y locations that are the highest in the total dot number map s(g,y), where the value of the density variation map n(g,x,y) is the highest. Specifically, the location (xMAX,yMAX), where the value of the density variation map n(g,x,y) is highest, is searched out from among the pixels in a y location group in the total dot number map s(g,y) where the number of dots is the highest, and among the pixels in the dot pattern d(g,x,y) where the pixel values are one. The pixel value of d(g,xMAX,yMAX) is set to "0" so that a dot is removed. Note that, if there are multiple locations where the value of the density variation map n(g,x,y) is the highest, the CPU selects a location where a dot is to be removed at random from the multiple locations.

Figure 6:
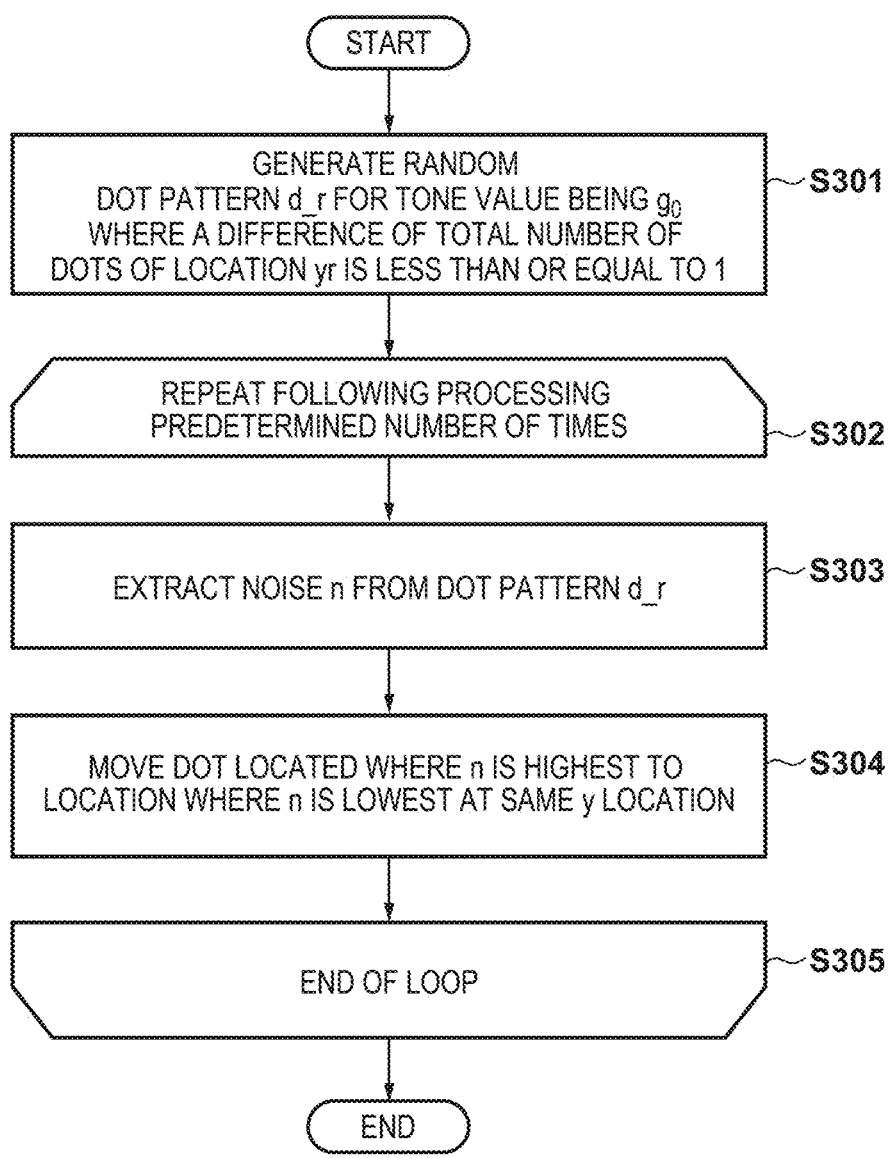
FIG. 6 is a flowchart illustrating an initial pattern sequence when creating a dither matrix.

The method of generating the initial dot pattern in step S100 will be described in detail next with reference to FIG. 6. Put simply, the CPU first generates a random dot pattern. Then, the CPU iteratively moves dots, starting from the random dot pattern, in order to generate the initial dot pattern d(g0), which has a low graininess and density unevenness that is not apparent.

In step S301, the CPU generates a random dot pattern d_r for the number of tones being g0. Here, d_r is a two-dimensional arrangement, and is also denoted as d_r(x,y). The size is the same as the dither matrix M(x,y), i.e., Sx in the x direction and Sy in the y direction. As described earlier, in the present embodiment, the values of Sx and Sy are both 256. Additionally, the pixel value is assumed to be "1" when a dot is present and "0" when a dot is not present, in the same manner as the above-described d(x,y).

In step S301, the CPU generates the random dot pattern for the number of tones being g0 by adding dots iteratively until the number of tones reaches g0, starting with an image in which not even a single dot is present.

The CPU sets a location yr in the y direction, where a dot is to be added, by incrementing the position in order from 1 to Sy. This is repeated from 1 once the end Sy is reached. Meanwhile, the CPU uses a random number to determine a candidate for the location in the x direction where a dot is to be added. Specifically, the CPU generates random numbers from 1 to Sx and determines a location xr in the x direction. If there is not dot at (xr,yr), the CPU adds a dot at that location. In other words, if the pixel value at d_r(xr,yr) is 0, the CPU sets the pixel value at d_r(xr,yr) to 1. However, if the pixel value at d_r(xr,yr) is already 1, the CPU generates a new random number to change the candidate for the location xr, in the x direction, where a dot is to be added. As a result, the dot pattern generated in step S301 is a random dot pattern in which imbalance in the total number of dots, calculated by totaling the dots in the x direction, is suppressed to less than or equal to 1 dot.

Steps S302 and S305 are the ends of a loop, which means that the processing from step S303 to S304 is repeated a predetermined number of times. Although the present embodiment assumes that the processing is repeated 10,000 times, the number is not limited thereto, and a predetermined convergence condition may be set instead.

In step S303, the CPU extracts a density variation n from the dot pattern d_r through the same method as that described with reference to step S103. The density variation n is a two-dimensional arrangement, and is also denoted as n(x,y).

In step S304, the CPU moves the dots on the basis of the density variation map n. First, the location (xMAX,yMAX) where the value of the density variation n(x,y) is highest is searched out from among the pixels where a dot is present at d_r(x,y). Then, the CPU searches out an x location (xMIN,yMAX) where the value of a density variation n(x, yMAX) is lowest, from pixels at the same y location (yMAX) as the location where the value of the density variation n(x,y) is the highest and where no dots are present. The CPU then moves the dot located at (xMAX,yMAX) to (xMIN,yMAX). In other words, the pixel value of the dot pattern d_r(xMAX,yMAX) is set to zero and the pixel value at the dot pattern d_r(xMIN,yMAX) is set to 1. The dot located where the density variation n is high is moved to a location where the density variation n is low, in the same y location. As a result, with the dot pattern generated in step S304, the total number of dots does not change for each location yr in the y direction, between before and after the dots move. Accordingly, a dot pattern having favorable dot dispersion characteristics can be generated while suppressing imbalance in the total number of dots, calculated by totaling the dots in the x direction, to less than or equal to 1 dot.

As described thus far, when a dot pattern is generated using the dither matrix generated through the method described in the present embodiment, differences between the number of dot ejections from nozzle to nozzle in the recording head 203 can be kept within a preset range (that is, the number of dot ejections can be made substantially uniform). This makes it possible to suppress a situation in which the lifespan of a specific nozzle is shortened, which in turn makes it possible to extend the lifespan of the recording head.

Second Embodiment

Uniformity in the number of dot ejections from nozzle to nozzle is also effective when correcting density unevenness, which suppresses a drop in image quality caused by variations in the ejection characteristics of ink from nozzle to nozzle. Effects in the correction of density unevenness, and an example of achieving those effects, will be described in the second embodiment.

In an actual image forming apparatus, the ejection characteristics of the nozzles arranged in rows in the recording head vary due to factors such as the process for manufacturing the recording head, the materials of which the recording head is formed, and the like. This variation in the ejection characteristics of the nozzles appears as non-uniformity in the size, ejection direction, and the like, of ink droplets ejected from the nozzles, and this, in turn, produces density unevenness in the recorded image. As a measure against this problem, there is a density unevenness correction technique, which suppresses density unevenness by correcting input image data on the basis of the ejection characteristics of the nozzles that constitute the recording head. Specifically, a density measurement test chart for finding a density conversion function for density unevenness correction is output, an image of the output density measurement test chart is read, the recorded density is measured, and density correction parameters for the image data are generated for each nozzle on the basis of the measured density data. Then, when printing the image, the input image data is corrected on the basis of the density correction parameters, and the image recording is controlled on the basis of the corrected image data. This forms an image in which the occurrence of density unevenness is suppressed.

Note that, instead of correcting the input image data, the thresholds in the dither matrix may be corrected on the basis of the ejection characteristics of the nozzles that constitute the recording head. In that case, the density correction parameters for the thresholds in the dither matrix are generated for each nozzle on the basis of the measured density data. Then, when printing the image, the thresholds in the dither matrix is corrected on the basis of the density correction parameters, and the image recording is controlled on the basis of the corrected the thresholds. This also forms an image in which the occurrence of density unevenness is suppressed.

If the dot locations in a dot pattern generated from the density measurement test chart are shifted toward specific nozzles, differences will arise in the number of ink ejections from nozzle to nozzle. As a result, the output density will be higher for nozzles having a higher number of ejections, and lower for nozzles having a lower number of ejections. As such, density differences caused by the ejection characteristics from nozzle to nozzle, and density differences caused by differences in the number of ink ejections from nozzle to nozzle, will both arise in the density measurement test chart that is output. It is difficult to take a measurement having isolated density variations caused by the ejection characteristics of the nozzle on the basis of the recording density of the test chart, which causes a problem in that the density unevenness correction will be less effective.

Thus, to accurately measure density variations caused by the ejection characteristics of the nozzles, it is useful to generate a dot pattern for a density measurement test chart using a dither matrix in which the numbers of dots formed by the nozzles, which are subject to the density unevenness correction, are adjusted so as to be uniform.

Furthermore, if the number of output dots relative to the input tones are different from nozzle location to nozzle location, there are situations where even if density variations caused by the ejection characteristics from nozzle to nozzle can be properly corrected, the way in which the correction works from nozzle to nozzle (i.e., the way in which the numbers of output dots are changed by the correction) varies and results in the density unevenness correction being less effective. Specifically, assume that, for example, there are two nozzles having a similar reduced injection amount for a single dot, compared to the ideal ejection amount. At this time, correction is carried out so that the pixel values are increased in the input image, in the same manner for the pixel rows corresponding to the two nozzles subject to correction. However, if the numbers of output dots differ depending on the tone from nozzle to nozzle, different numbers of output dots will be ejected even if the pixel values are the same before and after the correction. Density unevenness will, therefore, remain even after the density unevenness correction process is carried out.

Thus, to improve the density unevenness correction effectiveness in a recorded image with respect to an input image in which density unevenness correction is carried out from nozzle to nozzle, is effective to use a dither matrix in which the numbers of dots corresponding to each tone, formed by each nozzle, are adjusted so as to be uniform.

Figure 8:
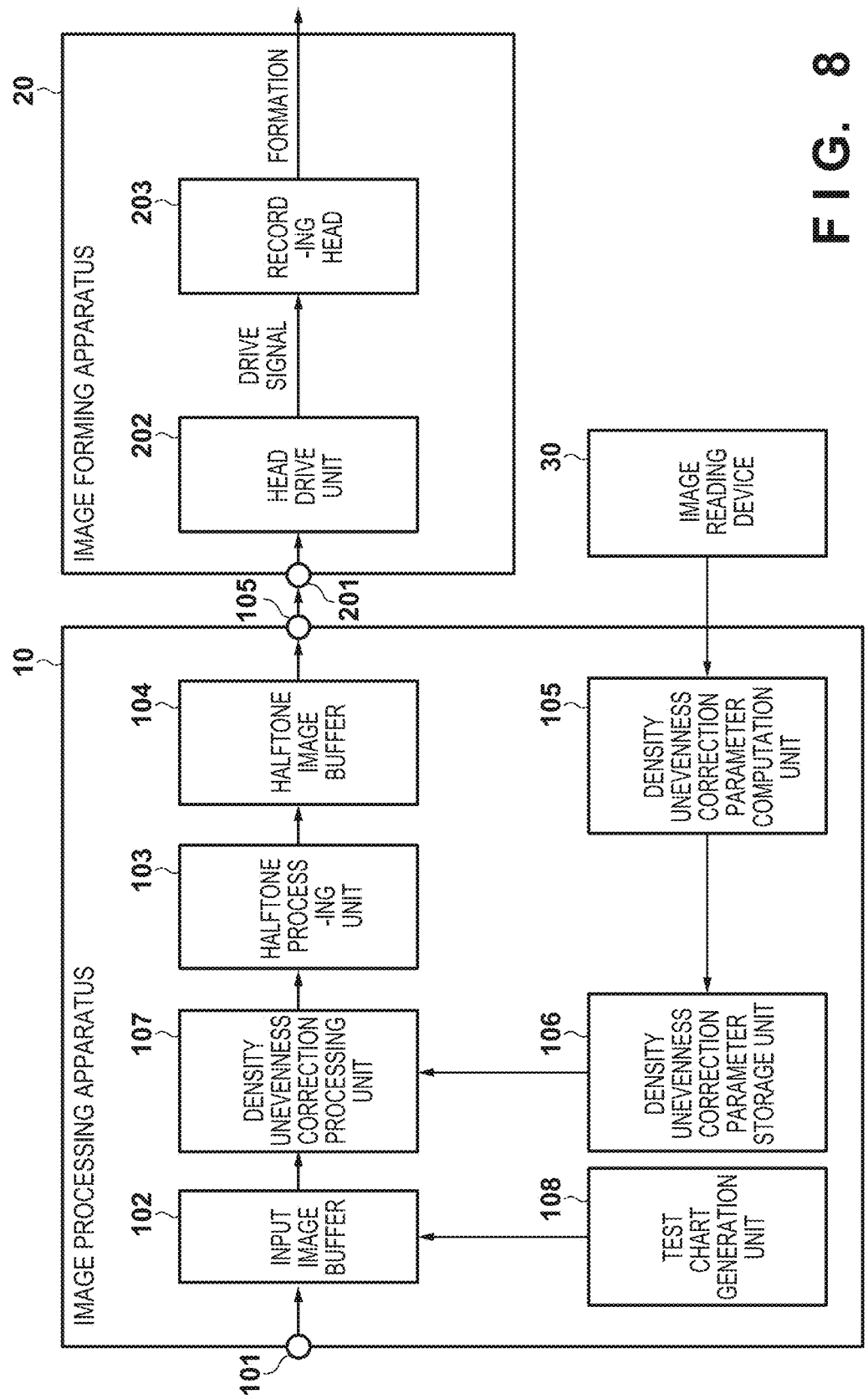
FIG. 8 is a block diagram illustrating the configuration of an image processing apparatus and an image forming apparatus according to a second embodiment.

FIG. 8 is a block diagram illustrating the configuration of an image processing apparatus 10 and an image forming apparatus 20 that can be applied in the second embodiment. Descriptions of parts that are the same as in the first embodiment will be simplified or omitted in the following descriptions.

In FIG. 8, the configuration is the same as in FIG. 1 aside from an image reading device 30, a density unevenness correction parameter computation unit 105, a density unevenness correction parameter storage unit 106, a density unevenness correction processing unit 107, and a test chart generation unit 108. Descriptions of the other constituent elements will be omitted.

The image reading device 30 reads an image recorded onto a recording medium by the recording head 203 and converts that image into electronic image data (read image data). A CCD line sensor, for example, can be used as the image reading device 30. The image reading device 30 according to the present embodiment is an in-line sensor arranged partway along a medium feed path, and reads the image recorded by the recording head 203 partway through the feeding, before the medium is discharged. The image reading device 30 can read the output result of a density measurement test chart, which will be described later.

The density unevenness correction parameter computation unit 105 measures a density on the basis of a ready image of the density measurement test chart acquired from the image reading device 30, and generates density unevenness correction value data (density unevenness correction parameters) for each nozzle. The density unevenness correction parameters generated by the density unevenness correction parameter computation unit 105 are stored in the density unevenness correction parameter storage unit 106.

The density unevenness correction processing unit 107 carries out image signal correction for suppressing density unevenness in the image printed on the recording medium, which arises due to a variation, and the like, in the ejection characteristics of the nozzles in the recording head 203. In the present embodiment, a density unevenness correction LUT, which is a density unevenness correction lookup table in which a conversion relationship between input signal values and output signal values is denoted for each of the nozzles in the recording head 203, is prepared, and the signal values are converted using this density unevenness correction LUT.

Figure 9:
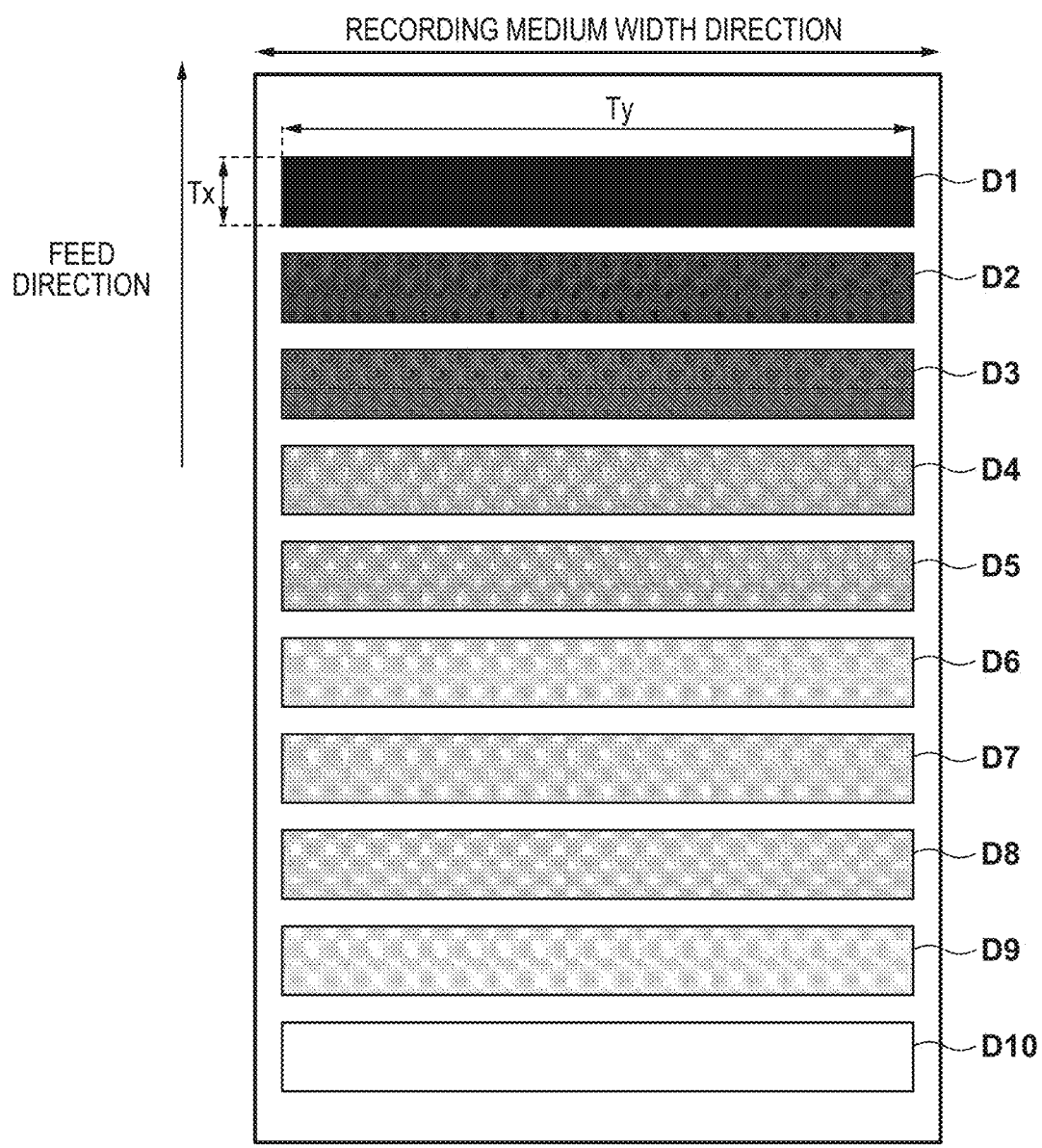
FIG. 9 is a diagram illustrating an example of a density measurement test chart according to the second embodiment.

The test chart generation unit 108 generates data of a density measurement test chart for obtaining density measurement data required to calculate the density unevenness correction parameters, and provides that data to the input image buffer 102. FIG. 9 illustrates an example of the density measurement test chart. Here, tone patches with uniform densities extending as bands in the feed direction are provided for each of predetermined tone values D1 to D10, with the patches being formed in rectangular regions, each having a width Ty in the recording medium width direction of the recording head 203 and a height Tx in the feed direction. As illustrated in FIG. 9, in the present embodiment, the chart has data equivalent to the width of the nozzles, so that the ejection characteristics can be derived for all the nozzles. Furthermore, in the present embodiment, all tones from 0 to 255 are subject to the density unevenness correction. The density measurement test chart is, therefore, generated so as to include patches for each tone corresponding to a density that, while being a discrete value from 0 to 255, is a value at an equal interval from the low-density side to the high-density side.

To acquire density variations caused by the ejection characteristics, it is useful to generate a dot pattern for a density measurement test chart using a dither matrix in which the numbers of dots formed by the nozzles are adjusted so as to be uniform. It is, therefore, necessary for the x direction size Tx of the density region for each tone in the density measurement test chart to be greater than or equal to the number of pixels for the x direction size Sx of the dither matrix (Sx is 256, in the present embodiment). In the present second embodiment, Tx=800 pixels.

Figure 10:
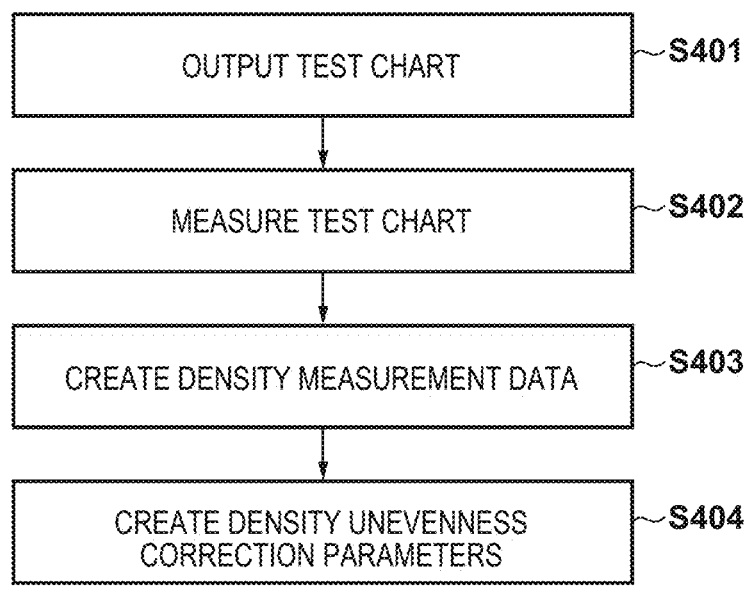
FIG. 10 is a flowchart illustrating a sequence for creating density unevenness correction parameters according to the second embodiment.

FIG. 10 is a flowchart illustrating an overview of a sequence for creating the density unevenness correction parameters, which is executed by a CPU (not shown) in the image processing apparatus 10 according to the present second embodiment. A program corresponding to this drawing is stored in predetermined memory (RAM or the like).

In step S401, the CPU causes the recording head 203 to output an image of the density measurement test chart generated by the test chart generation unit 108 onto a recording medium, by sending image data of the density measurement test chart to the input image buffer 102. At this time, the CPU does not cause the density unevenness correction processing unit 107 to carry out the density unevenness correction, and, instead, causes tone patches of uniform densities to be output. The CPU also causes the halftone processing unit 103 to generate a dot pattern of the density measurement test chart using a dither matrix in which the numbers of dots formed by the nozzles are adjusted so as to be uniform.

In step S402, the CPU controls the image reading device 30 to read an output result of the density measurement test chart and measure the test chart.

In step S403, the CPU creates one-dimensional measurement data in the recording medium width direction (the y direction) by integrating signals in the feed direction (the x direction) for each band-shaped density patch corresponding to a tone, by carrying out image processing on the read image. At this time, it is desirable that the signals be integrated in the feed direction (the X direction) in a range where the numbers of dots for the nozzles are uniform, so as to acquire the density variation caused by the ejection characteristics from nozzle to nozzle. In other words, it is desirable that an integration range Mx in the feed direction (the x direction) be an integral multiple of the printing width (mm) corresponding to the x direction size of the dither matrix. If the x direction size Sx of the dither matrix is 256 (pixels), the printing width (mm) is 256 (pixels)/1,200 (pixels/inch)×25.4 (mm/inch) 5.4 (mm). On the other hand, the printing width (mm) in the x direction size Tx of the density region for each tone in the density measurement test chart is 800 (pixels)/1,200 (pixels/inch)×25.4 (mm/inch) 16.9 (mm). In the present embodiment, the integration range Mx in the feed direction (the x direction) is 16.3 mm, which is less than the printing width of the x direction size of the density region (16.9 mm) and an integral multiple of (three times) the printing width of the x direction size Sx of the dither matrix (5.4 mm).

On the basis of measured one-dimensional data at the reading resolution of the image reading device 30 (e.g., 600 dpi in the recording medium width direction), the CPU carries out interpolation at a level corresponding to the resolution of the nozzles in the recording head 203 (the recording resolution), and creates density measurement data for each of the nozzle locations.

Next, in step S404, the CPU calculates the density unevenness correction parameters for each of the nozzles, i.e., calculates the density unevenness correction LUT, from the density measurement data acquired for each of the nozzle locations and target tone characteristics. Note that, density data for tone values aside from the points of measurement is obtained as a result of interpolating the density measurement data with respect to discrete tone values.

Next, the tone characteristics of a dot pattern generated through halftone processing using the dither matrix according to the present invention will be described with reference to FIGS. 7A and 7B.

Figure 7A:
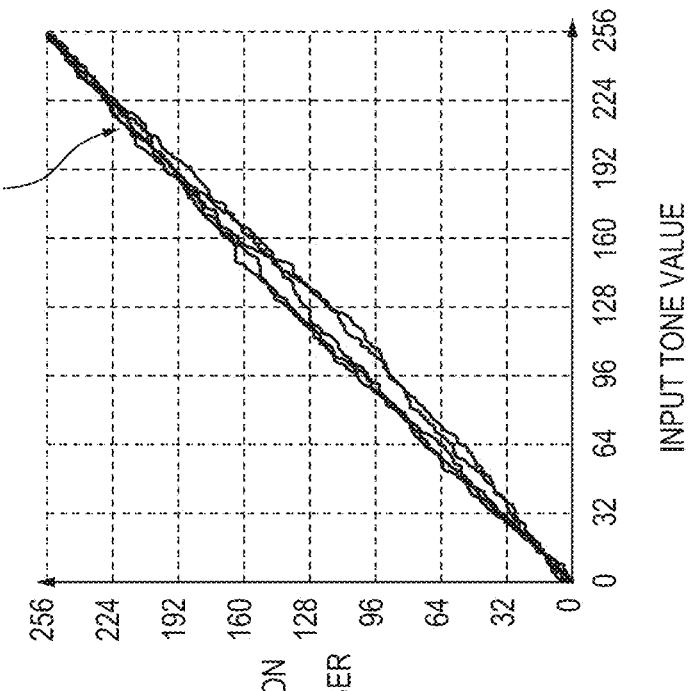
FIGS. 7A and 7B are diagrams illustrating the characteristics of a dot pattern generated with the dither matrix applied in the first embodiment.
Figure 7B:
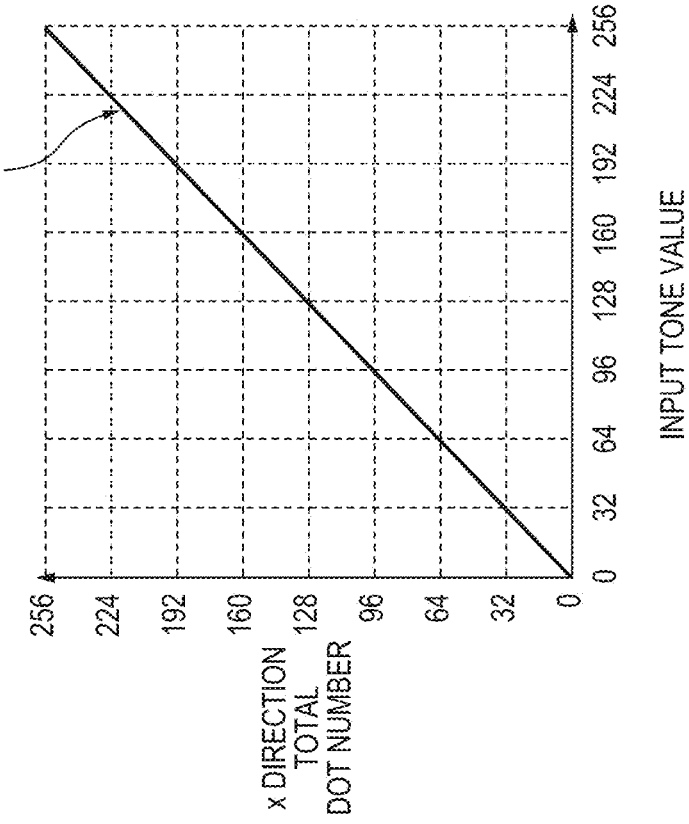

In the graphs illustrated in FIGS. 7A and 7B, the horizontal axis represents the input tone value, and the vertical axis represents a total number of dots xSum(y) in the x direction (simply "total number of dots" hereafter) in a dot pattern generated through a process of comparing an input image in, which has the same size (Sx,Sy) as the dither matrix and having a uniform tone, with the dither matrix M. If the size Sy of the dither matrix in the y direction is 256, it is possible to generate 256 graphs. However, it should be noted that the correspondences for only some of they locations are shown here in order to make the graphs easier to view.

FIG. 7A illustrates an example of a case when a dot pattern is generated using the dither matrix created according to the present embodiment. FIG. 7B illustrates a comparative example, of a case when a dot pattern is generated using a typical blue noise dither matrix created without taking into account the concept of making the frequency at which dots are generated uniform from nozzle to nozzle. Here, the typical blue noise dither matrix is created through the same method as the matrix creation method illustrated in FIG. 5, with the exception of steps S103, S104, S203, and S204. The typical blue noise dither matrix is assumed to be a matrix generated without steps S103 and S203, and by also referring to the density variation n(g,x,y) in steps S104 and S204.

Although FIG. 7A illustrates the total number of dots with respect to the input tone values at a plurality of locations in the y direction, the graphs overlap with each other and, therefore, appear to be only a single line. In other words, the total number of dots in the dot patterns generated using the dither matrix, with respect to input tone values having uniform densities, is substantially uniform regardless of the tone, and the increase in the number of dots from tone to tone is constant (linear).

However, as illustrated in FIG. 7B, when a dot patterns generated using a typical blue noise dither matrix, the correspondence relationship between the input tone values and the total number of output dots differs from y location to y location, and the increase in the number of dots from tone to tone is non-linear.

The total number of dots for the nozzles illustrated in FIG. 7A can match perfectly if the overall number of dots can be perfectly divided by the size Sy of the dither matrix in the y direction (that is, if the overall number of dots is an integral multiple of Sy). This holds true because the number of tones that can be simultaneously expressed by the dither matrix (the number of g) is Sy. In other words, assuming that the overall number of dots in the dot pattern generated using the dither matrix is d, the total number of dots for each nozzle can be taken as d/Sy if d % Sy=0. In other words, the total number of dots can be made uniform from nozzles nozzle by adjusting the threshold range of the dither matrix M so that d % Sy=0. If the density unevenness correction for each of the nozzles is to be applied to all of the tones as in the present embodiment, it is desirable that the total number of dots for each of the nozzles be uniform for all of the tones.

Note, however, that there are cases when the total number of dots did not match perfectly from nozzle to nozzle, such as when the size of the dither matrix is limited. For example, there are cases when, depending on the tone, the overall number of dots cannot be divided perfectly by the size Sy of the dither matrix in the y direction, and the total number of dots is not the same for each of they locations. In such a case, it is preferable that the difference between the total number of dots from y location to y location be less than or equal to one.

The density measurement test chart output in the present embodiment generates a density measurement test chart dot pattern using a dither matrix in which the numbers of dots formed by the nozzles are adjusted so as to be uniform. As such, there is no imbalance in the number of ink ejections from nozzle to nozzle, which makes it possible to accurately measure density variations caused by the ejection characteristics from nozzle to nozzle, using the recorded densities in the test chart. This makes it possible to improve the density unevenness correction effect based on the density measurement data.

On the other hand, a dither matrix in which the numbers of dots formed by the nozzles are adjusted so as to be uniform is also effective when referring to the density unevenness correction parameters for each nozzle and carrying out the density unevenness correction on the input image for each nozzle. When actually printing, the density unevenness correction processing unit 107 carries out the density unevenness correction on the input image for each nozzle by referring to the density unevenness correction parameters. Furthermore, the halftone processing unit 103 generates the dot pattern using a dither matrix in which the number of output dots have been adjusted so as to be uniform relative to the input tones for each of the nozzle locations. Because the number of dots increases constantly (linearly) from tone to tone, a dither pattern having an appropriate number of dots is generated with respect to the density unevenness correction amount for each nozzle, which makes it possible to improve the density unevenness correction effect for the recorded image.

As such, the measurement of the density unevenness correction parameters from nozzle to nozzle is not limited to using the above-described density measurement test chart, and the density unevenness correction effect for the recorded image can be improved even if the density unevenness correction is carried out for each nozzle using density unevenness correction parameters created using another measurement method.

Third Embodiment

In the second embodiment, all of the tones are subjected to the density unevenness correction. A third embodiment will describe an example of a case when the density unevenness correction is carried out only on some tones. For example, if almost no density unevenness arises in the patches D9 and D10, which are on the low-density side in FIG. 9, the density unevenness correction may be carried out only on densities higher than the density D9. In this case, the density range for which the density unevenness correction effect is to be improved is the range of densities D8 to D1 (where the density D1 is the maximum density). The density unevenness correction processing unit 107 determines whether or not the pixel value of a pixel in the input image is greater than or equal to the density D8. If the pixel value is greater than or equal to the density D8, the density unevenness correction processing unit 107 executes the density unevenness correction by referring to the density unevenness correction parameters. However, if the pixel value is less than the density D8, the density unevenness correction is not carried out, and the pixel value is output as-is.

However, there are cases when, in low-density parts, the dispersion characteristics of the dots are to be prioritized, as opposed to ensuring the density unevenness is not apparent. If only few dots are ejected onto the recording medium, multiple dots being ejected near each other will cause clumps of dots to be visible, and worsen the sense of graininess. As such, in the third embodiment, the dither matrix is switched when executing the halftone processing on the input image. If the pixel value of the pixel to be processed has a density of from D8 to D1, the same dither matrix as in the first embodiment (M1) is used. However, if the pixel value of the pixel to be processed is in a low-density part, greater than or equal to a density of D9, a dither matrix created without taking into account the concept of making the frequency at which dots are generated uniform from nozzle to nozzle (M2) is used.

The halftone processing unit 103 executes the following processing.

$Iin(x,y) \geq D8$ $Iout(x,y) = \text{BLACK if } Iin(x,y) > M1(x \% Sx, y \% Sy)$ $Iout(x,y) = \text{WHITE if } Iin(x,y) \leq M1(x \% Sx, y \% Sy)$ $Iin(x,y) < D8$ $Iout(x,y) = \text{BLACK if } Iin(x,y) > M2(x \% Sx, y \% Sy)$ $Iout(x,y) = \text{WHITE if } Iin(x,y) \leq M2(x \% Sx, y \% Sy)$ The dither matrix M2 refers only to the density variation n when adding a dot or removing a dot, and, as such, there are fewer restrictions when determining the dot arrangement than when using the dot creation method illustrated in FIG. 5. Accordingly, the dither matrix M2 is preferable to the dither matrix M1 from the standpoint of the dot dispersion characteristics.

As described thus far, according to the present embodiment, the density unevenness correction processing unit executes the density unevenness correction in accordance with the density range of the pixel value. If the pixel value is in a density range for which the density unevenness correction process is to be executed, the effect of the density unevenness correction is improved by using the dither matrix created so that the number of dots is uniform from nozzle to nozzle. However, if the pixel value is in a density range that does not require the density unevenness correction process, a dither matrix having higher dispersion characteristics is used.

The present embodiment describes a configuration in which the dither matrix referred to by the halftone processing is switched in accordance with the pixel value. However, there is a method in which, the same effect as in the third embodiment is achieved by a single dither matrix. This is a method in which when creating the dither matrix, whether or not to refer to the total dot number map is determined in accordance with the tone value g. For example, in the flowchart illustrated in FIG. 5, if the tone value g is less than or equal to a predetermined value (e.g., the density D9), step S203, among steps S201 to S207, is not executed, and the location where a dot is to be removed is determined by referring only to the density variation n(g,x,y) in step S204. As a result, if the tone value g is greater than or equal to a predetermined value, the dither matrix ensures that the total number of dots is uniform from nozzle to nozzle within a range that is an integral multiple of the y direction size Sy. The same effect as that of the third embodiment can be achieved even when carrying out halftone processing using a dither matrix created in this manner.

Other Embodiments

The foregoing embodiments describe examples of a case when the number of tones simultaneously recreated by the dither matrix is 256. However, the number of tones simultaneously recreated by the dither matrix may only be discrete tones among the number of tones in the input image. For example, if, of the tones 0 to 255, only the tones 0, 15, 30, 45, 60, 75, 90, 105, 120, 135, 150, 165, 180, 195, 210, 225, 240, and 255 are to be simultaneously recreated, the restriction on the total number of dots from nozzle to nozzle, indicated in FIG. 5, can be set for only the tone values that are simultaneously recreated. In this case, it is preferable that the size of the dither matrix in they direction be set to a multiple of the number of tones simultaneously recreated, i.e., eighteen.

Additionally, the foregoing embodiment describes an example of a method in which the halftone processing unit executes a comparison process using the dither matrix. However, the dither matrix created according to the first embodiment can also be applied in a method for determining a dot arrangement in accordance with a dither matrix. For example, the above-described dither matrix may be used in the method disclosed in Japanese Patent Laid-Open No. 2016-021735.

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™) a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus that generates image data for an image forming apparatus, the image forming apparatus having a recording head in which a plurality of recording elements are arranged in a first direction, and that forms an image on a recording medium by ejecting ink from the recording elements of the recording head toward the recording medium while the recording medium is fed relatively in a second direction that is perpendicular to the first direction, the image processing apparatus comprising:
   (A) one or more processors; and
   (B) one or more memories storing instructions, when executed by the one or more processors, causing the apparatus to function as:
      (a) an acquiring unit configured to acquire multi-valued input image data having a plurality of tones;
      (b) a conversion unit configured to convert the input image data into halftone image data indicating a dot pattern, by using a dither matrix; and
      (c) a correction processing unit configured to execute a density unevenness correction process in accordance with properties of each of the recording elements,
   wherein the properties of each of the recording elements are obtained by reading a chart image formed based on the halftone image data,
   wherein the dither matrix is a dispersive dither matrix, and has a size of Sx rows corresponding to the second direction, where Sx is a natural number, and
   wherein, in the dot pattern, a difference between the numbers of dots included in a range of Sx in the second direction, at each of the locations in the first direction, is less than or equal to one for each of the tones.

2. The image processing apparatus according to claim 1, wherein the dither matrix has a size of Sx rows corresponding to the second direction and Sy columns corresponding to the first direction, where Sx and Sy are natural numbers.

3. The image processing apparatus according to claim 2, wherein Sx and Sy are both greater than or equal to two hundred fifty-six.

4. A method of controlling an image processing apparatus that generates image data for an image forming apparatus, the image forming apparatus having a recording head in which a plurality of recording elements are arranged in a first direction, and that forms an image on a recording medium by ejecting ink from the recording elements of the recording head toward the recording medium while the recording medium is fed relatively in a second direction that is perpendicular to the first direction, the method comprising:
   acquiring multi-valued input image data having a plurality of tones;
   converting the input image data into halftone image data indicating a dot pattern, by using a dither matrix; and
   executing a density unevenness correction process in accordance with properties of each of the recording elements,
   wherein the properties of each of the recording elements are obtained by reading a chart image formed based on the halftone image data,
   wherein the dither matrix is a dispersive dither matrix, and has a size of Sx rows corresponding to the second direction, where Sx is a natural number, and
   wherein, in the dot pattern, a difference between the numbers of dots included in a range of Sx in the second direction, at each of the locations in the first direction, is less than or equal to one for each of the tones.

5. A non-transitory computer-readable storage medium storing a computer program that causes, when read and executed by a computer, the computer to execute the steps of a method of controlling an image processing apparatus that generates image data for an image forming apparatus, the image forming apparatus having a recording head in which a plurality of recording elements are arranged in a first direction, and that forms an image on a recording medium by ejecting ink from the recording elements of the recording head toward the recording medium while the recording medium is fed relatively in a second direction that is perpendicular to the first direction, the method comprising:
   acquiring multi-valued input image data having a plurality of tones;
   converting the input image data into halftone image data indicating a dot pattern, by using a dither matrix; and
   executing a density unevenness correction process in accordance with properties of each of the recording elements,
   wherein the properties of each of the recording elements are obtained by reading a chart image formed based on the halftone image data,
   wherein the dither matrix is a dispersive dither matrix, and has a size of Sx rows corresponding to the second direction, where Sx is a natural number, and
   wherein, in the dot pattern, a difference between the numbers of dots included in a range of Sx in the second direction, at each of the locations in the first direction, is less than or equal to one for each of the tones.

6. An image processing apparatus that generates image data for an image forming apparatus, the image forming apparatus having a recording head in which a plurality of recording elements are arranged in a first direction, and that forms an image on a recording medium by ejecting ink from the recording elements of the recording head toward the recording medium while the recording medium is fed relatively in a second direction that is perpendicular to the first direction, the image processing apparatus comprising:
   (A) one or more processors; and
   (B) one or more memories storing instructions, when executed by the one or more processors, causing the apparatus to function as:
      (a) an acquiring unit configured to acquire multi-valued input image data having a plurality of tones;
      (b) a conversion unit configured to convert the input image data into halftone image data indicating a dot pattern, by using a dither matrix; and
      (c) a correction processing unit configured to execute a density unevenness correction process in accordance with properties of each of the recording elements, wherein the properties of each of the recording elements are obtained by reading a chart image formed based on the halftone image data, wherein the dither matrix is a dispersive dither matrix, and has a size of Sx rows corresponding to the second direction, where Sx is a natural number, and wherein the conversion unit generates the halftone image using the dither matrix, which is created so that a difference between the numbers of dots included in a range of Sx in the second direction, at each of the locations in the first direction, is less than or equal to one for each of the tones.

7. A method of controlling an image processing apparatus that generates image data for an image forming apparatus, the image forming apparatus having a recording head in which a plurality of recording elements are arranged in a first direction, and that forms an image on a recording medium by ejecting ink from the recording elements of the recording head toward the recording medium while the recording medium is fed relatively in a second direction that is perpendicular to the first direction, the method comprising:

acquiring multi-valued input image data having a plurality of tones;

converting the input image data into halftone image data indicating a dot pattern, by using a dither matrix; and executing a density unevenness correction process in accordance with properties of each of the recording elements, wherein the properties of each of the recording elements are obtained by reading a chart image formed based on the halftone image data, wherein the dither matrix is a dispersive dither matrix, and has a size of Sx rows corresponding to the second direction, where Sx is a natural number, and wherein the halftone image data is generated using the dither matrix, which is created so that a difference between the numbers of dots included in a range of Sx in the second direction, at each of the locations in the first direction, is less than or equal to one for each of the tones.

8. A non-transitory computer-readable storage medium storing a computer program that causes, when read and executed by a computer, the computer to execute the steps of a method of controlling an image processing apparatus that generates image data for an image forming apparatus, the image forming apparatus having a recording head in which a plurality of recording elements are arranged in a first direction, and that forms an image on a recording medium by ejecting ink from the recording elements of the recording head toward the recording medium while the recording medium is fed relatively in a second direction that is perpendicular to the first direction, the method comprising:

acquiring multi-valued input image data having a plurality of tones;

converting the input image data into halftone image data indicating a dot pattern, by using a dither matrix; and executing a density unevenness correction process in accordance with properties of each of the recording elements, wherein the properties of each of the recording elements are obtained by reading a chart image formed based on the halftone image data, wherein the dither matriX is a dispersive dither matrix, and has a size of SX rows corresponding to the second direction, where SX is a natural number, and wherein the halftone image data is generated using the dither matriX, which is created so that a difference between the numbers of dots included in a range of SX in the second direction, at each of the locations in the first direction, is less than or equal to one for each of the tones.

* * * * *